3,376,105
ION EXCHANGE EXTRACTION OF VANADIUM
Alfred W. Naumann, Suffern, N.Y., assignor to Union
Carbide Corporation, a corporation of New York
No Drawing. Filed May 13, 1964, Ser. No. 367,230
10 Claims. (Cl. 23—22)

ABSTRACT OF THE DISCLOSURE

A process is provided for recovering vanadium in the form of ammonium metavanadate from impure metavanadate ion containing solutions having a pH ranging from about 6.0 to about 7.2 which comprises the step of contacting a basic anion exchange resin possessing replaceable chloride ions with a metavanadate ion containing solution to thereby load the ion exchange resin with metavanadate ions, treating the metavanadate loaded resin with an ammonium containing stripping solution whose chloride content is so regulated that it will effectively remove the metavanadate ions from the ion exchange resin without causing the metavanadate ions to be precipitated in the ion exchange resin bed and then recovering the vanadium value as ammonia metavanadate.

---

The present invention relates to a process for selectively recovering ammonium metavanadate from impure or contaminated aqueous metavanadate ion containing solutions by utilization of ion exchange resins.

A method commonly used for liberating vanadium from ore is to roast vanadium bearing ore in the presence of sodium chloride and then to leach it with water. The function of the roasting step is to convert the vanadium into water-soluble sodium metavanadate. The solutions that result from the leaching step therefore contain vanadium primarily as the metavanadate ion and are essentially neutral in pH. In addition to sodium metavanadate, the solutions contain a significant quantity of unreacted sodium chloride, and greater or lesser quantities of other impurities or contaminants such as sodium, potassium, calcium, phosphorus, molybdenum and arsenic.

Conventional methods of recovering vanadium from water leach liquors consist of precipitating a material called "red cake" by acidifying the liquors with sulfuric acid. Red cake precipitates are mixtures of poorly crystalline, hydrated, alkali polyvanadates. After drying, red cake contains 80 to 90% $V_2O_5$, the remainder is predominantly $Na_2O$ and $K_2O$. Modern industrial uses of $V_2O_5$ require a product which is at least 98% pure. Consequently, further purification of red cake is necessary. Two methods have been used for this purification in the past. One involves dissolving red cake in aqueous ammonia followed by acidification and precipitation of the vanadium as anhydrous ammonium hexavanadate. An alternate method consists of dissolving red cake in ammonia followed by the addition of ammonium chloride or ammonium sulfate. This method results in the crystallization of anhydrous ammonium metavanadate. Both ammonium metavanadate and ammonium hexavanadate yield high purity $V_2O_5$ when decomposed by heat.

The aforementioned recovery procedures have several disadvantages. First of all, the reactions by which the various vanadium precipitates are formed are highly sensitive to the composition of the solution, that is, to impurities which are present. When unfavorable conditions exist, vanadium losses through solubility, entrainment or handling are significant. Operational difficulties are encountered with both of the above described procedures. The main problem with the ammonium hexavanadate procedure is that the presence of impurities, such as molybdenum, interferes with the formation of the hexavanadate. Hence, if such impurities are present in the ore, and they frequently are, they must first be removed by additional purification steps. The ammonium metavanadate method has two disadvantages. One is a consequence of the appreciable solubility of ammonium metavanadate. Its high solubility leads to losses in the mother liquor and in the wash liquor. The other disadvantage is that a considerable excess of ammonium chloride or sulfate is needed as a salting agent. Thus, relatively low yields and high reagent costs are associated with the ammonium metavanadate process. These factors combine to make both ammonium metavanadate and ammonium hexavanadate production, according to prior art methods, difficult and expensive.

It is an object of this invention to provide a method for selectively recovering ammonium metavanadate from impure or contaminated aqueous metavanadate ion containing solutions without recourse to sensitive precipitation and solubilization steps.

It is another object of this invention to provide a process for selectively removing vanadium values from contaminated aqueous metavanadate ion containing solutions by utilizing ion exchange resins.

It is a further object of this invention to provide a continuous process for selectively recovering vanadium in the form of ammonium metavanadate from aqueous contaminated metavanadate ion bearing solutions wherein the only reagents which need be added during continuous operation are those required to replenish the ammonium ions used up in the formation of the final product.

The aforementioned and other objects are achieved by contacting a contaminated aqueous metavanadate ion containing starting solution, such as salt roast quench liquors, with a basic anionic exchange resin which contains chloride ions as the replaceable ion. In this step the ion exchange resin is loaded with metavanadate ions which are thereby selectively recovered from the aqueous solution to the exclusion of such contaminants as phosphorus, arsenic, molybdenum, potassium, calcium and sodium. The metavanadate loaded resin is then contacted with an aqueous chloride stripping solution in order to transfer the metavanadate ions from the loaded ion exchange resin to the stripping solution. This step is sometimes referred to as elution of the loaded resin. The loaded stripping solution or eluate is then unloaded to recover the vanadium therefrom as ammonium metavanadate by crystallization or precipitation, preferably with ammonium chloride.

In a preferred embodiment of this invention, the supernatant liquid from the precipitated ammonium metavanadate is recycled to the ion exchange resin. In a continuous system such recycling would lead to a steady state where the ammonium chloride additions would be balanced by the ammonium ions removed in the ammonium metavanadate product and the chloride ions removed by the resin. Under such a procedure, the reagent requirements to produce ammonium metavanadate, and subsequently $V_2O_5$ from salt roast quench liquors would be the stoichiometric amount of ammonium chloride required to form ammonium metavanadate. In other words, when elution is followed by an addition of ammonium chloride equivalent to the vanadium picked up during elution, the supernatant liquid remaining after precipitation will have essentially the same composition as that of the starting eluant. The ammonium ions of the reagent will be removed from solution in the ammonium metavanadate product, and the chloride ions will replace those removed during loading of the resin.

The preferred starting solutions of the present invention contain vanadium in the form of the metavanadate ion. Vanadium exists in that form in aqueous solutions having a pH ranging from about 6.0 to about 7.2. In the process of this invention, it is preferable that the starting solution have a pH of about 6.8 to 7.2. The process of this invention selectively removes metavanadate ions from starting solutions which may be contaminated with any one of a number of dissolved elements such as molybdenum, phosphorus, potassium, sodium, calcium and arsenic. Since liquors resulting from water leaching of salt roasted vanadium ores usually have a pH of about 7, and since the metavanadate ion is selectively removed by certain ion exchange resins, the process of this invention is ideally suited for recovering vanadium from salt roast quench liquors. There need be little or no pH adjustment of the solutions or valence changes of the vanadium in the solution in order to remove interfering ions prior to treatment of these liquors by the methods of the present invention.

Removal of metavanadate ions from the solution by chloride ions on the exchange resin follows an exchange reaction of the type which may be represented as:

Vanadium + Chloride → Vanadium + Chloride
in solution   on resin     on resin    in solution It has been discovered that this exchange does not occur in a 1 for 1 ionic exchange, but rather that the metavanadate ion exists as a tetramer and that it displaces four chloride ions simultaneously from a specific region of the resin. Basic to this discovery was recognition of the manner in which metavanadate anions interact with anion exchange resins. It was unexpectedly found that the exchange reaction has an unusual chloride concentration dependence, and that chloride behaves like a monovalent ion in solution, but like a tetravalent ion in the resin phase. It was found that the interaction can be represented as follows:

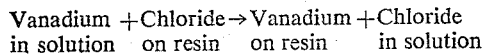

$V_4O_{12}^{-4}$ Solution + $Cl_4^{-4}$ Resin
$= V_4O_{12}^{-4}$ Resin + $4Cl^-$ Solution This gives rise to an equilibrium expression of the form:

$$K = \frac{(V)(C_{Cl})^4}{(S-V)(C_V)}$$

$V$ = concentration of vanadium ions in the resin phase
$C_V$ = concentration of vanadium ions in solution
$C_{Cl}$ = concentration of chloride ions in solution
$S$ = Total ion exchange capacity of the resin The importance of the equilibrium expression can perhaps be best shown by an example. The above equation can be rearranged to the form:

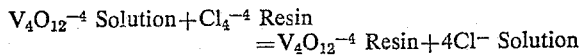

$$\frac{V}{S} = \frac{1}{1 + \frac{(C_{Cl})^4}{KC_V}}$$

The term $V/S$ corresponds to the fraction of resin sites occupied by vanadium. Taking $K=86$, the value determined experimentally for Amberlite IRA-402 resin, and if $C_V = 0.1$ M; then $V/S$ is equal to 0.90 when $C_{Cl}$ is 1.0 M, and $V/S$ is equal to 0.03 when $C_{Cl}$ is 4.0 M. Hence, it can be seen that resin loadings are high (90% of capacity) when a solution 1 molar in chloride is used, but low (3% of capacity) when a 4 molar solution is used. Thus, a resin will effectively remove vanadium from a solution 1 molar in chloride, but will release vanadium to a 4 molar solution. This is a direct result of the fourth power dependence for chloride concentration in the equilibrium expression, a dependence which was entirely unexpected and not predictable.

Certain requirements must exist in order to have practically operable exchange conditions. First, the ion exchange loading and stripping reactions must be favorable. That is, the equilibria between metavanadate anions, chloride anions, and resin must be such that essentially complete removal of vanadium from the starting solution can be obtained. Also, the equilibria must be such that loaded resin will rapidly and efficiently be eluted by concentrated chloride solutions. Second, the rate at which resin loading is achieved must be reasonably fast, otherwise low flow rates and high resin inventories would be needed. Third, the requirements for a recycle eluant must not be so limiting that control problems would arise; specifically, there must be a range over which eluant compositions can be varied to permit some flexibility in the conditions for producing the ammonium metavanadate precipitate.

The ion exchange properties of vanadium can be applied in a number of ways. After loading a resin, and in doing so having effected a separation of vanadium from the impurities in quench liquors, it is possible to elute with an ammonium chloride solution and precipitate a high purity Red Cake. Another approach is to elute with a mixture of sodium and ammonium chlorides, then precipitate anhydrous ammonium hexavanadate. Neither of these is as attractive as the direct isolation of vanadium as ammonium metavanadate. In order to achieve that result the following requirements must be met: (1) the chloride concentrations of the eluant prior to use must be high enough to provide elution, (2) the composition of the solution following elution must be such that pure ammonium metavanadate precipitates when ammonium chloride is added; such precipitation should be nearly complete, and (3) the composition of the solution in contact with the resin should be such that no precipitation occurs during elution, since formation of a precipitate would block passage through the resin. All three requirements must be met simultaneously.

It has been discovered that all of these requirements are met by certain solutions of sodium chloride and ammonium chloride when used at certain temperatures. In order to meet the above three requirements and in order to have operable elution conditions, the stripping operation must take place at a temperature which is above that at which any crystallization or precipitation occurs. Operable stripping solution compositions were found to fall in the range of 3.4 to 4.2 moles of sodium chloride per liter of stripping solution and 0.50 to 0.80 moles of ammonium chloride per liter of stripping solution. The operable temperature range is from about room temperature up to the maximum operating temperature of the particular resin being used, for Amberlite IRA-402 it is about 77° C. The preferred stripping temperature range is 45–55° C. Such conditions have both suitability and elution efficiency. However, upon the addition of at least a stoichiometric amount of $NH_4Cl$ and cooling below about 35° C. (preferably about 25° C.) essentially all of the vanadium will precipitate as ammonium metavanadate and the composition of the filtrate will revert to that of the original eluate.

The ion exchange materials useful in the present invention are well known and are available commercially. Typical basic anion exchange materials and their preparation are described, for example, in U.S. Patent Nos. 2,366,008; 2,591,573; 2,591,574; and 2,681,391. Such materials may consist of polymerized styrene-divinylbenzene, containing reactive ion exchange sites. Other materials such as phenolformaldehyde resins and polystyrene can also be employed if they contain the proper reactive sites. Ion exchange resins found particularly useful in the present process include those which are porous, have high capacity, and are strongly basic. Amberlite IRA-402 is such a resin. Structurally it consists of trimethyl ammonium groups attached to a styrene-divinylbenzene copolymer matrix formed through methylene linkages wherein the chloride atoms are the replaceable ionic species. Its functional structure may be represented as —N—(CH$_3$)$_3^+$Cl$^-$. The chlorine ions of the resin are exchanged for the metavanadate ions of the feed liquor during loading of the resin and vice versa, i.e. chloride ions of the stripping solution are exchanged for the metavanadate ions of the resin during unloading or stripping of the resin.

Ion exchange properties are determined primarily by the kind of functional groups present. The number of functional groups per unit volume determine the ion-exchange capacity of the resin, while the amount or cross-linking in the backbone structure of the resin effect resin porosity. Differences in exchange capacity and porosity give rise to secondary effects related only to the efficiency of the resin rather than to its operability in a particular process. Other ion exchange resins useful in the present invention include Amberlites IRA–400 and IRA–401, Permutit S–1 and Dowex–1, 11 and 21K. These resins differ from Amberlite IRA–402 and from each other chiefly by the number of functional groups present and by the degree of cross-linking in the copolymer matrix.

The following example is given by way of illustration only and is not intended to limit the scope of the invention.

Example

Four Pyrex pipes each five feet long and having an inside diameter of 1½ inches were used as columns. These were filled to a depth of 30 in. with Amberlite IRA–402 resin and connected in such manner that loading was possible at the top of any of the columns, and so that any three columns could be run in series following a top to bottom flow in each. Such connections make it possible to operate the columns continuously whereby any three columns may be loaded, while the fourth column is being stripped. Substantially all of the vanadium is retained in the first column of the series being loaded. When it is thus loaded, it is taken out of the series and stripped while the other three columns are being loaded. Diaphragm pumps were used for loading the columns, stripping them, as well as for washing.

A typical cycle of operation will be described. Loading the ion exchange column was accomplished by passing 8 liters of feed liquor having a vanadium concentration of 11.86 g./l. (calculated as V$_2$O$_5$) through three columns connected in series at a rate of 7.5 g.p.m./sq. ft. of column cross-sectional area. The loaded columns were then washed with about 1 liter of deionized water in order to remove entrained feed liquor. The first column was then stripped of metavanadate ions with 7 liters of a solution at 50° C. containing 3.8 moles NaCl per liter and 0.75 mole NH$_4$Cl per liter, at a flow rate of 7.5 g.p.m./sq. ft. of column cross-sectional area. The column was then washed with about 1 liter of deionized water to remove entrained elution liquor. Ammonium metavanadate was precipitated from the loaded eluate by adding a stoichiometrically equivalent amount of a NH$_4$Cl. The precipitate formed upon cooling the solution to 25° C. Crystals of ammonium metavanadate were filtered, washed with deionized water and dried. The filtrate was recycled for elution of the next column. In the overall process the recovery of vanadium was in excess of 99% based on the amount fed to the ion exchange column.

A typical analysis of V$_2$O$_5$ prepared by heating the ammonium metavanadate made by the process of this invention contains only the following impurities:

| | Percent |
|---|---|
| Na$_2$O | 0.085 |
| K$_2$O | 0.01 |
| SiO$_2$ | 0.05 |
| Cl | 0.025 |
| Al | 0.01 |
| P | 0.01 |
| SO$_3$ | 0.01 |
| Total | 0.200 |

It is apparent, therefore, that the V$_2$O$_5$ made from the product of this invention is well within the purity required by modern industrial uses of vanadium pentoxide, the V$_2$O$_5$ is, in fact, about 99.8% pure.

What is claimed is:
1. A process for selectively recovering ammonium metavanadate from impure aqueous metavanadate ion containing solutions comprising the steps of
   (1) contacting a basic anion exchange resin having chloride ions as the replaceable ions, with an impure aqueous metavanadate ion containing solution having a pH ranging from about 6.0 to about 7.2, thereby loading said ion exchange resin with metavanadate ions,
   (2) contacting said metavanadate loaded resin with an aqueous stripping solution at a temperature which is above that at which any crystallization occurs, and which contains essentially 3.4 to 4.2 moles of sodium chloride and 0.50 to 0.80 moles of ammonium chloride per liter of stripping solution, thereby transferring said metavanadate ions from the ion exchange resin to said stripping solution, and
   (3) recovering ammonium metavanadate from the loaded stripping solution.

2. The process of claim 1 wherein the basic anion exchange resin consists of trimethyl ammonium chloride groups attached to a styrene-divinylbenzene copolymer matrix formed through methylene linkages and wherein the chloride ions are the replaceable ions.

3. The process of claim 1 wherein the impure aqueous metavanadate ion containing solution is the quench liquor resulting from salt roasting of vanadium bearing ore.

4. The process of claim 1 wherein the contaminated aqueous metavanadate ion containing solution has a pH of 6.8 to 7.2.

5. The process of claim 1 wherein the metavanadate loaded resin is contacted with said aqueous stripping solution at a temperature of about 45–55° C.

6. The process of claim 1 wherein the ammonium metavanadate is recovered from the loaded stripping solution by precipitation.

7. The process of claim 1 wherein the ammonium metavanadate is recovered from the loaded stripping solution by precipitation with ammonium chloride at a temperature below about 35° C.

8. The process of claim 1 wherein the ammonium metavanadate is recovered from the loaded stripping solution by precipitation with ammonium chloride at a temperature below about 25° C.

9. The process of claim 6 wherein the filtrate from the precipitation step is recycled to the stripping solution.

10. A process for selectively recovering ammonium metavanadate from impure aqueous metavanadate ion containing solutions comprising the steps of
   (1) contacting
      (a) a basic anion exchange resin which consists of trimethyl ammonium chloride groups attached to a styrene-divinylbenzene copolymer matrix formed through methylene linkages, wherein the chloride ions are the replaceable ions with,
      (b) aqueous metavanadate ion containing quench liquor resulting from salt roasting of vanadium bearing ore and having a pH of about 6.8 to 7.2, thereby loading said ion exchange resin with metavanadate ions,
   (2) contacting said metavanadate loaded resin with an aqueous stripping solution at a temperature of about 45–55° C., and containing essentially 3.4 to 4.2 moles of sodium chloride and 0.50 to 0.80 moles of ammonium chloride per liter of stripping solution, thereby transferring said metavanadate ions from the ion exchange resin to said stripping solution,
   (3) precipitating ammonium metavanadate from the loaded stripping solution by the addition of ammonium chloride at a temperature below about 25° C.,
(4) separating the precipitated ammonium metavanadate from the supernatant liquid,
(5) recycling the supernatant liquid from step (4) to the stripping solution, and
(6) drying the ammonium metavanadate product.

References Cited

UNITED STATES PATENTS 3,206,277  9/1965  Burwell et al. _____ 23—51 X

OTHER REFERENCES

McLean et al.: "U.S. Atomic Energy Commission Report—ACCO-63," Technical Information Extension, Oak Ridge, Tenn., Sept. 20, 1954, pp. 3, 17, 18, 23, 61 to 64.

Ryabchikov et al.: Translation of article from "Akademiya Nauch SSSR, Trudy Komissii po Analilicheskoi Khimii," vol. 7(x), pp. 64–76, 1956, pp. 1 to 15 of translation.

OSCAR R. VERITZ, *Primary Examiner.*

H. T. CARTER, *Assistant Examiner.*